United States Patent
Frank

[19]

[11] Patent Number: 5,842,534
[45] Date of Patent: Dec. 1, 1998

[54] CHARGE DEPLETION CONTROL METHOD AND APPARATUS FOR HYBRID POWERED VEHICLES

[76] Inventor: Andrew A. Frank, P.O. Box 2103, El Macero, Calif. 95618

[21] Appl. No.: 963,037

[22] Filed: Nov. 3, 1997

Related U.S. Application Data

[63] Continuation of Ser. No. 455,104, May 31, 1995, abandoned.

[51] Int. Cl.$^6$ .................................................. B60K 6/04
[52] U.S. Cl. ........................................ 180/65.2; 180/65.4
[58] Field of Search .................................. 180/65.1, 65.2, 180/65.3, 65.4, 65.8; 318/587

[56] References Cited

U.S. PATENT DOCUMENTS

| | | |
|---|---|---|
| 4,042,056 | 8/1977 | Horwinski . |
| 4,180,138 | 12/1979 | Shea . |
| 4,269,280 | 5/1981 | Rosen . |
| 4,335,429 | 6/1982 | Kawakatsu ........................ 180/65.2 X |
| 4,400,997 | 8/1983 | Fiala . |
| 4,533,011 | 8/1985 | Heidemeyer et al. . |
| 4,697,660 | 10/1987 | Wu et al. . |
| 4,923,025 | 5/1990 | Ellers . |
| 5,115,183 | 5/1992 | Kyoukane et al. ................ 180/65.2 X |
| 5,117,931 | 6/1992 | Nishida ................................. 180/65.2 |
| 5,125,469 | 6/1992 | Scott ..................................... 180/65.2 |
| 5,172,006 | 12/1992 | Suzuki et al. ...................... 180/65.2 X |
| 5,343,970 | 9/1994 | Severinsky . |

FOREIGN PATENT DOCUMENTS

| | | |
|---|---|---|
| 2310238 | 1/1977 | France . |
| 2494642 | 5/1982 | France . |
| 4206360 | 9/1993 | Germany . |

OTHER PUBLICATIONS

"Renault launches NEXT, an interesting hybrid car", Road & Track, pp. 47, 49, Aug. 1996.

Woods Gas–Electric Car, Instruction No. 80, Dyke's Encyclopedia, 1935.

Frank et al., "Computer Simulation of the University of Wisc. Hybrid–Electric Vehicle Concept", May 1973.

Volkswagen AG, "Golf with Diesel/Electric Hybriddrive", undated.

Primary Examiner—J. J. Swann
Assistant Examiner—Michael Mar
Attorney, Agent, or Firm—John P. O'Banion

[57] ABSTRACT

A charge depletion method and apparatus for operating the electric motor and small auxiliary power unit, such as an internal combustion engine, in a hybrid electric vehicle (HEV) separately or together depending upon the driving conditions. Operation of the electric motor and auxiliary power unit are coordinated so that the vehicle operates as zero emissions vehicle (ZEV) or electric car at all speeds below a highway cruising threshold, unless the depth of discharge of the batteries exceeds a charge threshold in which case the vehicle operates in an HEV mode. Further, the vehicle operates in an HEV mode at speeds above the cruising threshold. The batteries are depleted during operation and are not charged by the auxiliary power unit, except during emergencies in which case the batteries are only charged enough to provide a performance enhancement to the small auxiliary power unit.

31 Claims, 5 Drawing Sheets

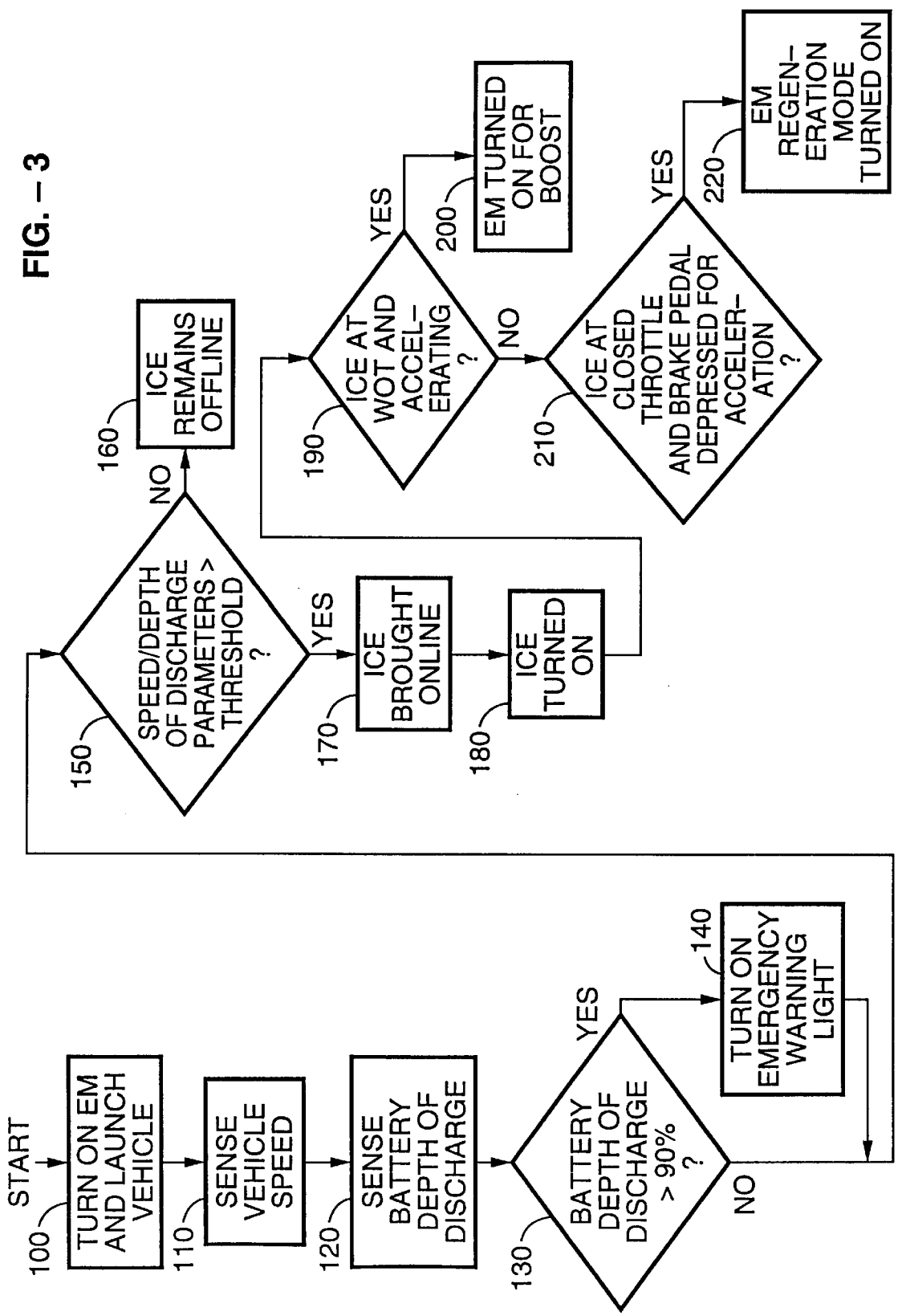

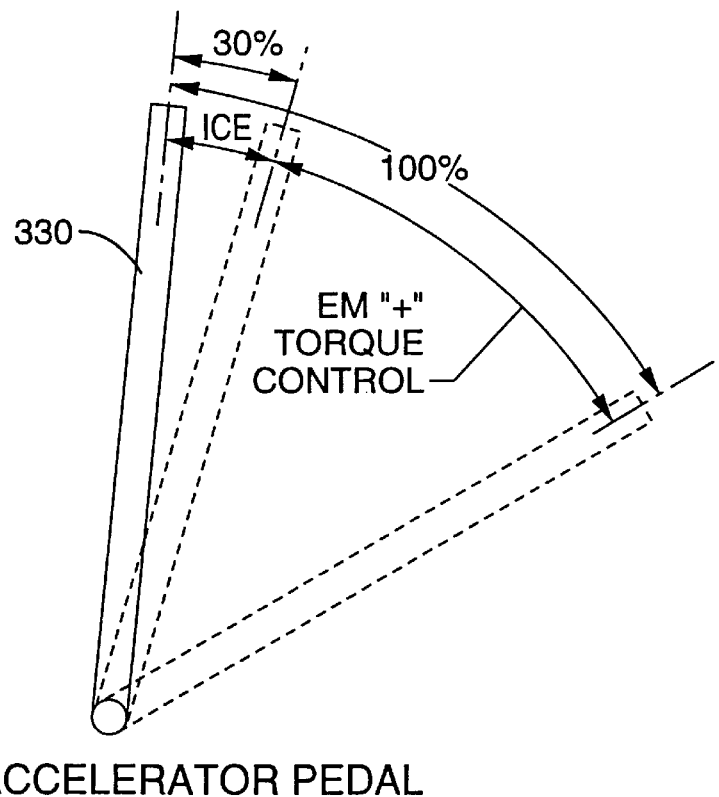
FIG. – 6  ACCELERATOR PEDAL
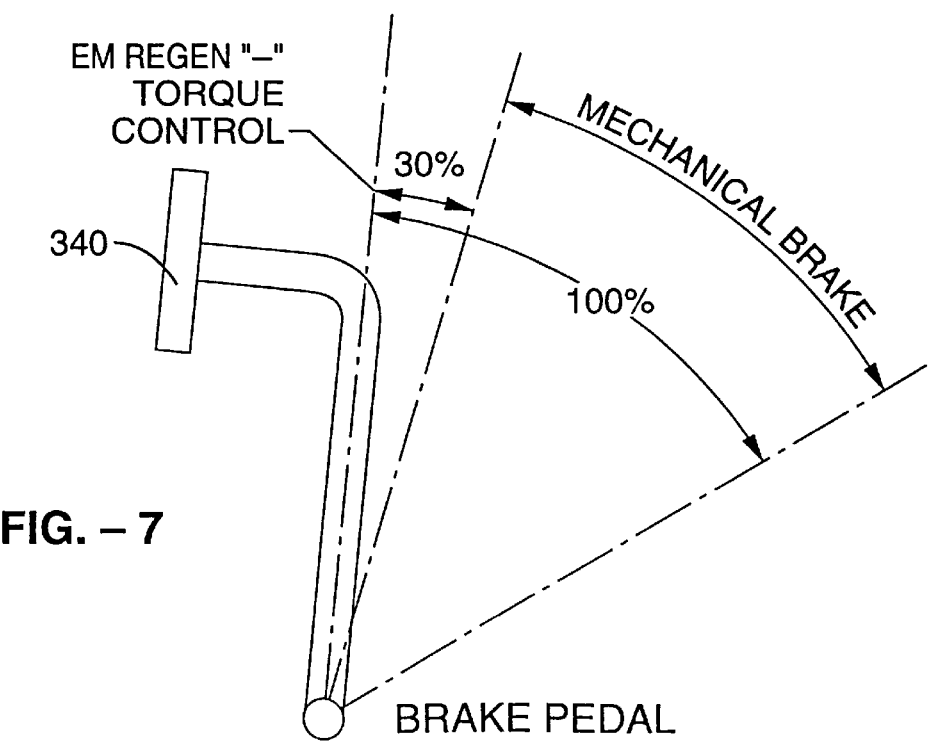
FIG. – 7  BRAKE PEDAL

CHARGE DEPLETION CONTROL METHOD AND APPARATUS FOR HYBRID POWERED VEHICLES

CROSS-REFERENCE TO RELATED APPLICATIONS

This application is a continuation of application Ser. No. 08/455,104 filed on May 31, 1995, now abandoned.

BACKGROUND OF THE INVENTION

1. Field of the Invention

This invention pertains generally to hybrid powered vehicles employing both electric motors and auxiliary power units, and more particularly to controlling the relative operation of the electric motor and an auxiliary power unit such as an internal combustion engine, fuel cell, or external combustion engine in a parallel or series hybrid powered vehicle for maximizing range and efficiency while minimizing pollutants.

2. Description of the Background Art

A hybrid electric vehicle (HEV) is a vehicle with electricity as the primary energy source and an auxiliary power unit (APU) as the secondary source. The APU is typically an internal combustion engine (ICE) utilizing reformulated gasoline, methanol, ethanol, or compressed natural gas as a fuel source. The electrical energy is stored in chemical storage batteries or capacitors. A series hybrid electric vehicle uses the ICE to drive a generator which supplies power to the electric motor (EM) or charges the batteries, whereas a parallel hybrid uses the ICE to directly drive the wheels. In both configurations, the ICE is used to supplement the energy capacity and power capability of the battery pack.

A series hybrid is the most common powertrain configuration choice among HEV designers due to its low emissions capability, fuel economy, and simple EM/ICE integration. A series hybrid has the capability to use the ICE to charge the batteries while driving. Ideally, the ICE is point-tuned to operate under constant load and speed at the point of lowest specific fuel consumption, which could produce low tailpipe emissions. The EM and ICE are only electrically connected, allowing each power source to be independently placed in the vehicle, further adding to the simplicity of a series hybrid. Series hybrids, however, suffer from inherent energy losses due to the many energy conversions required to convert chemical fuel energy to motive energy at the wheels. Thus, what is gained from engine efficiency is lost to electrical and/or electrochemical inefficiency.

A parallel hybrid on the other hand, using a properly-sized ICE to directly transmit torque to the drive wheels, can provide better overall efficiency than a series hybrid. The engine can be sized so that, at wide-open throttle, the ICE maintains steady-state highway speeds and operates at its peak efficiency. In addition, the ICE can be tuned for excellent fuel economy and low tailpipe emissions. Most parallel hybrid vehicles are configured with a large ICE, however, leading to poor fuel economy and high cost. The EM is selected for urban driving and acceleration, since the ICE may not provide the power required for this driving demand. In emergency situations, the ICE can provide "limp-home" capability when the batteries reach a depth of discharge (DOD) where the EM can no longer accelerate the vehicle.

Various control strategies have been previously developed for operating the EM and ICE in hybrid vehicles. For example, U.S. Pat. No. 5,343,970 discloses a hybrid vehicle where, at low speeds or in traffic, the EM alone is used to drive the vehicle. Under acceleration and during hill climbing, both the EM and ICE are used. At steady state highway cruising, only the ICE is used. The control system also senses battery charge and uses the ICE to charge the battery when necessary. U.S. Pat. No. 4,923,025 discloses a hybrid vehicle which operates on an EM until a predetermined cruising speed is reached. The ICE is then brought on line and the EM is turned off. U.S. Pat. No. 4,042,056 discloses a hybrid vehicle which is powered by an EM except in circumstances where the battery charge is depleted, in which case an ICE is brought on line.

None of the existing control schemes, however, integrate the operation of the EM and ICE in a hybrid vehicle in a way which maximizes efficiency and range while maintaining performance of the vehicle; that is, using a "charge depletion" control method in accordance with the present invention. Conventional control schemes operate on the principle of sustaining the charge on the batteries, rather than depleting the batteries.

The foregoing patents reflect the state of the art of which the applicant is aware and are tendered with the view toward discharging applicant's acknowledged duty of candor in disclosing information which may be pertinent in the examination of this application. It is respectfully stipulated, however, that none of these patents teach or render obvious, singly or when considered in combination, applicant's claimed invention.

SUMMARY OF THE INVENTION

The present invention generally comprises a "charge depletion" method and apparatus for operating the electric motor (EM) and internal combustion engine (ICE) in a hybrid electric vehicle (HEV) separately or together depending upon the driving conditions. By way of example, and not of limitation, the invention provides for operating the hybrid powertrain in a zero emissions vehicle (ZEV) mode and in an HEV mode. In the ZEV mode, the EM provides all driving power while the ICE is uncoupled and turned off. In the HEV mode, operation of the EM and ICE is coordinated for maximum range and efficiency. Typically, the vehicle can be driven in all driving conditions until the batteries reach a state of approximately 85% depth of discharge or more. The usable battery charge corresponds to a city driving range of approximately 160 km. Based on recent studies of vehicle usage, a range of approximately 115 km will satisfy over 80% of the typical road vehicle miles traveled by the public daily. Therefore, the vehicle power train will function as a ZEV for a majority of drivers in the city. Further, the entire vehicle will satisfy the needs of over 99% of the drivers.

The ICE in accordance with the present invention is typically very small (e.g., 0.016 kW/vehicle kg and is typically sized to power the vehicle for freeway cruise at speeds above approximately 113 kph for a range of 690 km or more. However, in typical city driving conditions, driving with the ICE alone produces less-than-desirable performance because of its small size. This is an important aspect of the invention since it encourages the driver to periodically charge the vehicle batteries at home. Additionally, the varying driving conditions inherent in city driving will cycle the engine and reduce efficiency. Emissions would increase and fuel efficiency would decrease.

In accordance with the present invention, as long as the battery depth of discharge is less than approximately 50% and the vehicle speed is less than approximately 113 kph, then the EM is operated alone; that is, the ICE is uncoupled and turned off. Therefore, the vehicle operates in a ZEV mode. At speeds greater than approximately 113 kph, the vehicle operates in an HEV mode where the ICE is used as the primary source of power and the EM is automatically activated to (i) assist the ICE during acceleration (e.g., for passing or climbing hills) or (ii) regenerate energy back into the battery during braking. Once the depth of discharge exceeds approximately 50%, the ICE is brought on line and turned on at varying vehicle speeds below approximately 113 kph. As the depth of discharge increases, the vehicle speed at which the ICE is brought on line decreases in order to increase overall range. As a result, the invention combines the advantages of a ZEV vehicle in most city driving conditions as well as extended city range and high freeway efficiencies from the ICE.

Control of vehicle speed is accomplished using a two-stage accelerator pedal. Approximately the first ⅓ of pedal travel controls the throttle position of the ICE and the last ⅔ controls the torque of the EM. When operating in the HEV mode the ICE operates at high throttle settings and, when the ICE is operating at wide open throttle (WOT) but additional power is still required, the driver depresses the pedal further and the EM torque is automatically added. Therefore, vehicle acceleration is proportional to the accelerator pedal position as in a conventional car. Transmission shifting is accomplished similar to conventional cars.

Since vehicle "launch" is performed by the EM, an automatic transmission would not need a torque converter. Further, a computer is not needed to coordinate the ICE throttle and EM torque control. Operation of the brake pedal is similar to the accelerator pedal, where the first part of the pedal depression provides regenerative braking by the EM, and the continued deflection eventually activates mechanical brakes.

In accordance with the method of the invention, the batteries are not charged by the ICE during operation of the vehicle, except during emergency conditions, in which case charging would only be partial and solely to maintain performance. For example, if the batteries were completely depleted and the ICE was running, the batteries could be slightly charged by the ICE (e.g., 5%) only to provide additional performance to get home or to a charging station. The manner of doing so would be for the driver to pull off to the side of the road, place the transmission in neutral, and depress both the accelerator pedal and the brake pedal at the same time so as to allow the ICE to operate at high rpm for several minutes. In such event, the ICE and EM would both be on line, and the ICE would drive the EM in a regenerative mode so as to charge the batteries. In normal operation, however, the batteries are charged only from an external power source. Thus, the hybrid control method of the present invention will be referred to herein as a "charge depletion" hybrid, in contrast to conventional "charge sustaining" hybrids which charge the batteries from the ICE. In this context, note that long range batteries (e.g., 130 to 160 km) are required to make the vehicle practical. No controls are available to the driver of the vehicle other than an accelerator pedal, brake pedal and, if desired, a transmission clutch pedal. Operation in the ZEV and HEV modes are automatic, and the driver does not have control over those modes of operation.

An object of the invention is to provide a control system for a hybrid electric vehicle powertrain which can provide super fuel efficiency.

Another object of the invention is to provide a control system for a hybrid electric vehicle powertrain which can provide for ultra low emissions.

Another object of the invention is to provide a control system for a hybrid electric vehicle powertrain which can provide for high performance.

Another object of the invention is to provide a control system for a hybrid electric vehicle powertrain which can provide for low cost manufacturing due to simplicity.

Another object of the invention is to provide a control system for a hybrid electric vehicle powertrain which is simple to operate.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only:

FIG. 3 is a flow chart showing an embodiment of the method of the present invention.

FIG. 6 is a diagram showing operation of a dual-mode accelerator pedal in accordance with the present invention.

FIG. 7 is a diagram showing operation of a dual-mode brake pedal in accordance with the present invention.

DESCRIPTION OF TIE PREFERRED EMBODIMENTS

Referring more specifically to the drawings, for illustrative purposes the present invention is embodied in the apparatus and method generally depicted therein. It will be appreciated that the apparatus may vary as to configuration and as to details of the parts, and that the method of the invention may vary as to the steps and their sequence, without departing from the basic concepts as disclosed herein.

Figure 1:
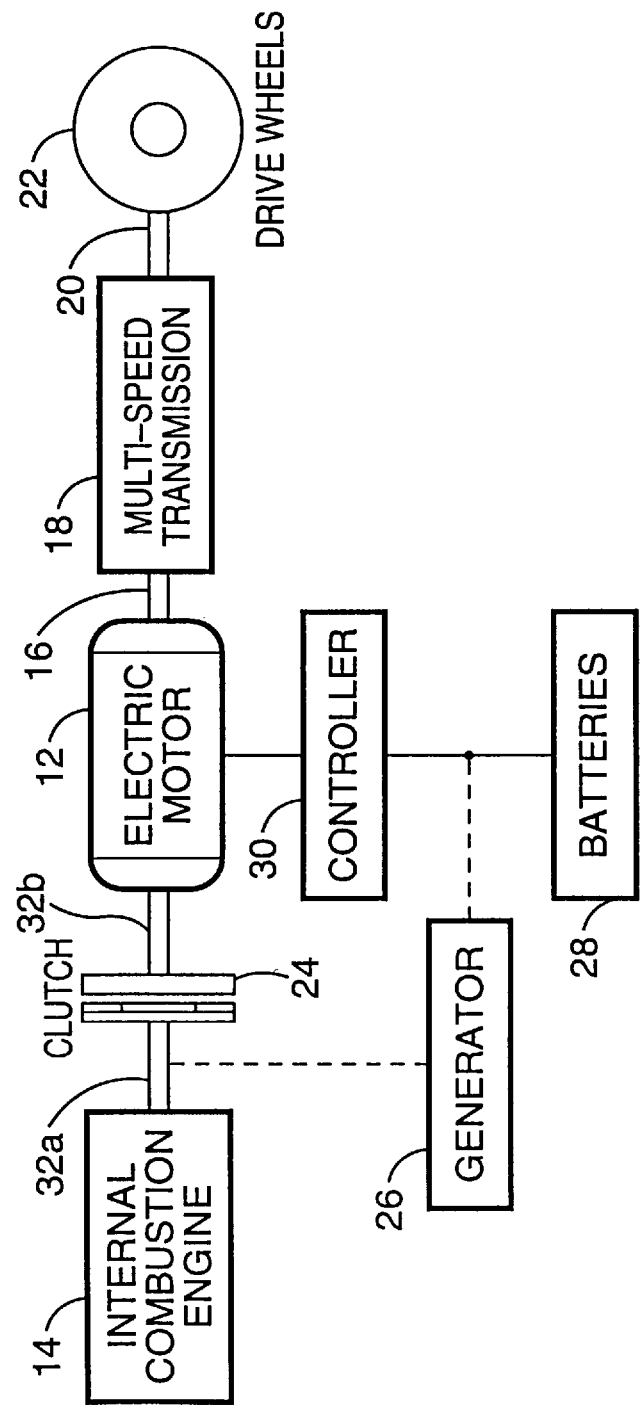
FIG. 1 schematically depicts a hybrid vehicle powertrain in accordance with the present invention showing the preferred embodiment with a clutch for a "parallel" configuration, and showing a generator which can replace the clutch for a "series" configuration.

In accordance with the present invention, a hybrid electric vehicle can enjoy the advantages of electric vehicles (e.g., zero emissions, no idling, efficient energy usage) and conventional gasoline vehicles (long range, widely available fuel). Referring first to FIG. 1, a hybrid powertrain configuration 10 in accordance with the present invention utilizes a large electric motor (EM) 12 and an auxiliary power unit (APU) 14 which is preferably a small internal combustion engine (ICE) integrated in a drive package. Alternatively, APU 14 may be an external combustion engine, such as a Sterling or steam engine, or a fuel cell which would be electrically connected to the batteries and throttle control. The EM 12, which typically has a power output of approximately four times that of ICE 14, may be any high power electric motor operating from batteries, such as a Unique Mobility SR180N brushless, permanent-magnet DC motor or the like with regenerative braking. The ICE 14 may be any small gasoline engine such as a Briggs & Stratton Vanguard or the like. The EM 12 is typically coupled to a shaft 16 which transmits power to a multi-speed transmission 18 which in turn drives a shaft 20 which transmits power to the wheels 22. The transmission 18 may be manual or automatic and, if automatic, would not require a torque convertor. Continuously variable transmissions may be employed as well. A conventional cable actuated shifting system (not shown) retrofitted to the transmission 18 produces a standard shift pattern.

Powertrain 10 shown in FIG. 1 is depicted in a generic form, applicable to both series and parallel hybrids. In a parallel hybrid configuration, ICE 14 would be coupled to EM 12 via an electromagnetic clutch 24 or the like. In a series hybrid configuration, ICE 14 would not be coupled to EM 12 but, instead, would drive a generator 26 which would in turn provide electric power to drive EM 12 but would not charge batteries 28. In either configuration, a controller 30 is used to control the speed and torque of the EM 12.

Figure 2:
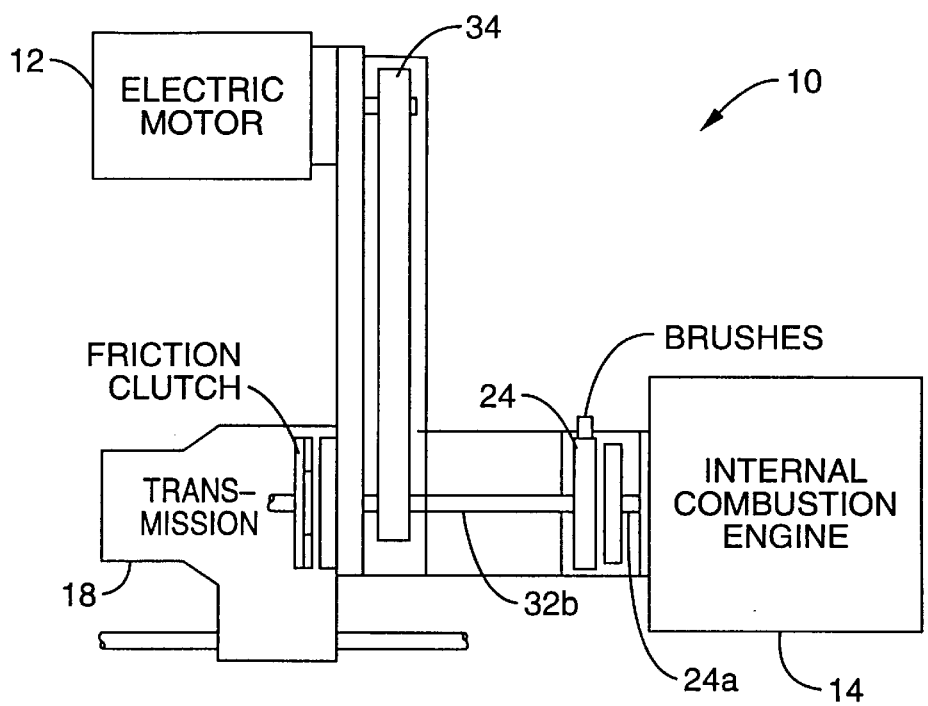
FIG. 2 is a schematic diagram of an embodiment of a parallel hybrid vehicle powertrain in accordance with the present invention.

In the parallel hybrid configuration, the electromagnetic clutch 24 is typically a Warner SF825 or the like coupled to intermediate shafts 32a, 32b, and is used to engage and disengage the ICE 14 from the drivetrain. If specially designed, EM 12 could run at the same speed as the ICE 14 and thus could be in line with the transmission 18 and the ICE 14 as shown in FIG. 1. Alternatively, a belt 34, such as a 36-mm Kevlar Gates Poly Chain GT belt or the like can be used to connect the EM 12 to the intermediate shaft 32b in a configuration as shown in FIG. 2. By using a reduction ratio of 1.56:1 or the like, the rpm range of the EM 12 is matched to that of the ICE 14. Either way, the EM 12 is always coupled to the drivetrain. This allows the regenerative braking capability of the EM 12 to be available on all modes, so as to load the drivetrain and produce electricity when desired. The regenerative braking capability of EM 12 is activated when the brake pedal is slightly depressed.

As indicated above, the EM 12 can be a Unique Mobility SR180N electric motor or the like, which is a permanent-magnet, brushless direct current electric motor which produces 32 kW continuous and 60 kW peak power. With that motor a Unique Mobility CR20-300 solid-state controller is preferably used to control speed and torque. The 200-volt controller has a current limit of 300 amperes providing up to 60 kW intermittent power for the electric motor/controller pair. Note that a permanent-magnet brushless DC electric motor was chosen over an AC induction motor because of its superior power-to-weight and low speed characteristics. The CR20-300 controller also has a speed-sensitive regenerative braking function which can extend ZEV range by approximately 10% during city driving.

The charge-depletion parallel hybrid design requires that the ICE 14 be sized to maintain the vehicle load requirements at highway cruising speeds (95–105 km/hr) as well as to provide the best fuel economy at cruising speeds. Additionally, the ICE 14 must have low specific fuel consumption and emissions. These requirements mandate careful selection of the ICE 14. An internal combustion engine can be made to operate most efficiently at wide open throttle; therefore, the power output of the ICE 14 must match the power required to maintain the vehicle at a desired highway cruising speed. After comparing various engine characteristics, it was found that the 15 kW, 570 cc overhead-valve, two cylinder Briggs & Stratton Vanguard 4-cycle engine was preferable for a prototype vehicle. To further improve the performance of the stock internal combustion engine, several modifications were made. First, the fixed ignition timing and the carburetor of the stock engine were replaced by an electronic control unit (ECU) which governs ignition timing and fuel injection. The programmable electronic control unit allowed for customizing the engine management scheme for the driving requirements of the HEV, and allowed the air-fuel ratio and spark timing to be custom-tailored to achieve low fuel consumption and low emissions in all ranges of engine operation.

The ECU provides engine management by monitoring sensors attached to the ICE 14. An engine crankshaft position sensor enables the ECU to adjust spark timing dynamically. By varying the spark timing, an increase in both power and fuel economy were achieved. The ECU also monitors the engine for "knock and ping" or pre-detonation. Pre-detonation occurs when the fuel mixture does not burn smoothly but explodes prematurely, resulting in lower power output and possible engine failure. A knock sensor is incorporated into the engine management system and the ECU retards the ignition timing to prevent knocking and pinging.

A closed loop feedback electronic fuel injection system was the key to obtaining high fuel economy and low emissions. Using an oxygen sensor in the exhaust, the ECU monitors combustion and regulates the duration of the fuel injector pulses to maintain a stoichiometric air fuel (AF) ratio of 14.7:1. A stoichiometric AF ratio is important in reducing emissions and fuel consumption. The electronic controls for the engine were necessary to obtain the desired performance for the HEV.

The compression ratio (CR) was increased to obtain a more complete combustion of the air-fuel mixture. The CR was increased from the stock 8.5:1 CR to 9.5:1. Compression ratios higher than 9.5:1 caused knocking and pinging as well as excessive NOx emissions. NOx formation occurs more readily at the higher combustion temperatures caused by higher compression ratios. The combustion chamber inside the head was also reshaped to obtain optimal combustion.

The complete powertrain described above, including the electric motor controller, weighs 133 kg and can produce 179 N-m of torque. It has a maximum power input to the transaxle of 75 kW. Also, to improve the reliability of the drivetrain it was found desirable to redesign and remanufacture some of the components for proper alignment and tighter tolerances. Further, the cooling of the drivetrain compartment was greatly improved, allowing for higher efficiencies and reliability to be realized by the electric motor and internal combustion engine.

The ICE 14 was sized to power the vehicle for freeway cruise at 113 kph for 690 km using a 20.1 liter gasoline tank. In typical city driving conditions, however, driving with the ICE 14 alone produces less-than-desirable performance. Additionally, the varying driving conditions inherent in city driving will cycle the engine and reduce efficiency. Emissions would increase and fuel efficiency would decrease.

In order to overcome these inefficiencies, the charge depletion control method of the present invention was developed to monitor vehicle speed and depth of discharge (DOD) of the battery, and to control the EM 12 and ICE 14 as a function thereof. The invention provides for operating the hybrid powertrain in a zero emissions vehicle (ZEV) mode and in a hybrid electric vehicle (HEV) mode. In the ZEV mode, the electric motor provides all driving power while the internal combustion engine is uncoupled and turned off. Typically, the vehicle can be driven in all driving conditions until the batteries reach a state of approximately 100% DOD. The usable battery charge corresponds to a range of approximately 120–160 km.

Referring to FIG. 3, a general flow diagram of the control method is shown. At step 100, the EM 12 is turned on to "launch" or start the vehicle and the vehicle operates in a ZEV mode. At steps 110 and 120, the vehicle speed and battery depth of discharged are sensed, respectively. At step 130 a determination is made as to whether there is less than approximately 10% charge left. If the depth of discharge is greater than 90%, then an emergency warning light is activated at step 140 so that the driver can take appropriate emergency measures to recharge the batteries. For example, the driver can stop the vehicle, put the transmission in neutral, push the accelerator and brake pedals simultaneously, and run the ICE 14 at high rpm for several minutes. This will partially charge the batteries and allow the vehicle to "limp" home for a complete recharging.

At step 150 the vehicle speed and battery depth of discharge are compared with a control curve and, if those parameters exceed a predetermined threshold, the ICE 14 is brought on line by engaging the clutch at step 170 and turning the engine on at step 180. Otherwise, the ICE 14 remains off line and the vehicle continues to operate in a ZEV mode at step 160. Once the ICE 14 is operating, the EM 12 is available for supplemental use. If ICE 14 is operating at wide open throttle and a call for acceleration or other additional power demand is sensed at step 190, then at step 200 EM 12 is used to supply additional power; for example, when the vehicle is accelerating or climbing a hill. If ICE 14 is operating at closed throttle and the brake pedal is depressed for deceleration at step 210, then at step 220 the EM 12 is operated in a regeneration mode at step 230. In this mode, the EM 12 loads the vehicle powertrain to assist in slowing the vehicle, and generates electricity which will provide a charge to the batteries. If desired, during deceleration or braking the ICE 14 could be taken off line and turned off by decoupling the clutch and cutting of the flow of fuel.

Figure 4:
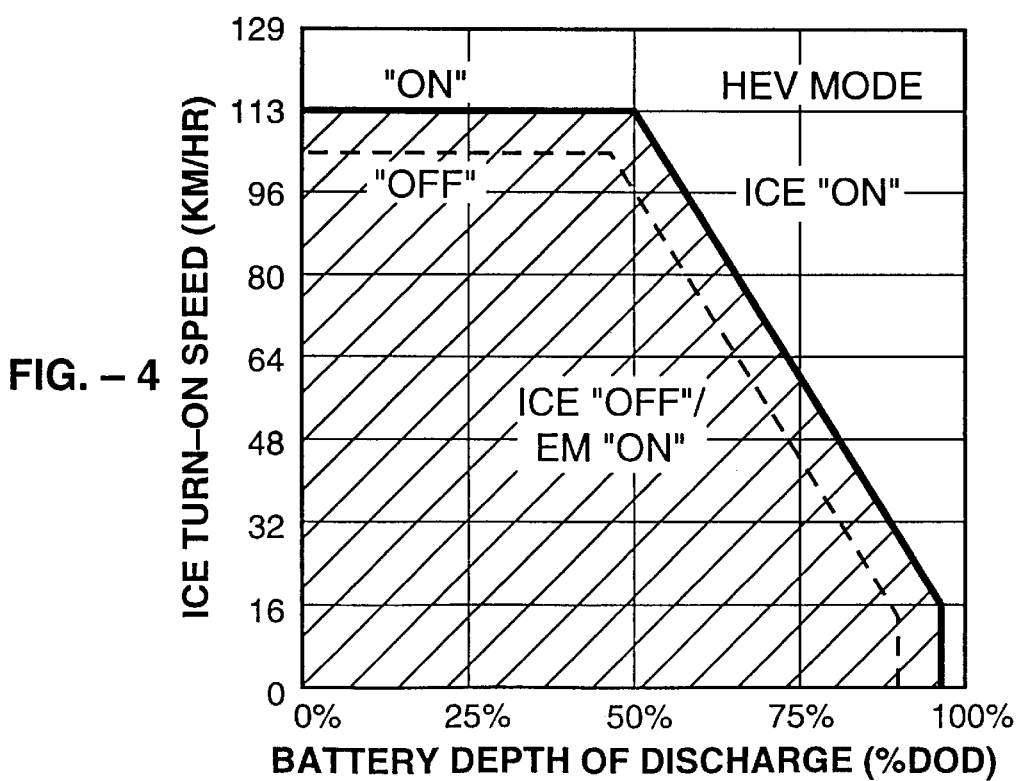
FIG. 4 graphically depicts the operation of a hybrid vehicle electric motor and internal combustion engine as function of vehicle speed and battery depth of discharge in accordance with the present invention.

Referring also to FIG. 4, the control parameters used for coordinating the operation of the EM 12 and the ICE 14 in step 150 of FIG. 3 are graphically shown. The area below the "on" threshold curve is where the vehicle operates in a ZEV mode, with the EM 12 turned on and the ICE 14 decoupled and turned off. The area above the "on" threshold curve is where the vehicle operates in a HEV mode with the ICE 14 coupled and turned on, and with the EM 12 being used only for accelerating, climbing hills and regenerative braking.

As can be seen from FIG. 4, as long as the battery DOD is less than approximately 50% and the vehicle speed is less than approximately 113 kph, then the EM 12 is operated alone. This is the range of speeds typically encountered in city driving. Therefore, the vehicle operates as a ZEV. When the vehicle is operating at speeds in excess of approximately 113 kph, which corresponds to freeway driving, the ICE 14 is turned on and the ICE 12 is used only for accelerating, climbing hills, and regenerative braking. However, once the DOD exceeds approximately 50%, the ICE 14 is brought online at varying speeds as a function of DOD; that is, as the DOD increases, the speed at which the ICE 14 is brought online decreases in order to increase overall range. Therefore, the ICE 14 is not turned on unless the vehicle speed exceeds approximately 113 kph or unless the batteries are approximately 50% depleted. Then it is brought on according to the batteries' DOD. After the ICE 14 is turned on and vehicle is operating in a HEV mode, if the vehicle speed/depth of discharge parameters fall below the "off" threshold curve, the ICE 14 is decoupled and turned off. Then, since the EM 12 is still online, the vehicle again operates in a ZEV mode. The control band between the "on" threshold curve and the "off" threshold curve prevents undesirable or excessive cycling of the ICE 14 due to fluctuations in sensed speed and depth of discharge. As an alternative to separate "on" and "off" thresholds, a single threshold could be used in combination with a time delay between the "on" and "off" modes to prevent frequent cycling.

In a typical vehicle employing the present invention, the 50% depletion point of the batteries should occur at approximately 115 km of city driving. If a driver is on a freeway and exceeds 113 kph but stays below 120 kph (which is a speed where the ICE 14 alone will be insufficient to power the vehicle), the driver uses no battery electrical energy except when needed to pass someone or to climb a hill or mountain (a very small amount is used constantly since the EM 12 is always online). With the amount of energy storage in such a vehicle, a 3300 meter high mountain can be climbed at 115 kph using the small gasoline engine and the large electric motor on highways constructed to current US standards. There should be energy left in the battery after such a climb to continue for some distance. When the vehicle is stopped for the driver or passengers to have lunch, it can be recharged, to top off the batteries if necessary or desired. This capability makes the configuration and control system of this invention generally applicable to the public and provides the vehicle a capability comparable to a conventional car. The difference, of course, is super fuel efficiency (e.g., 2.3 to 2.5 liters per 100 km) and Ultra Low Emission Vehicle (ULEV) capability. The fuel efficiency will be two to three times the economy of a conventional vehicle, while the performance will be equal or better.

As indicated above, when driving in the city beyond approximately 50% percent DOD of the battery, the gasoline engine will come "on" at a lower speed depending on the DOD. This will extend the electric range for city driving to approximately 350 to 375 km. In order to drive this distance in the city, a driver would spend nine to ten hours behind the wheel. Less than 0.1 percent of the population would drive this far in the city. Of course, the control curve of FIG. 4 can be adjusted for the kind of driving done by most people, and objectives of the regulating agencies. As a result, the invention provides for the advantages of a zero emissions vehicle in city driving conditions and extended range and high efficiencies from an internal combustion engine at freeway/highway speeds.

Figure 5:
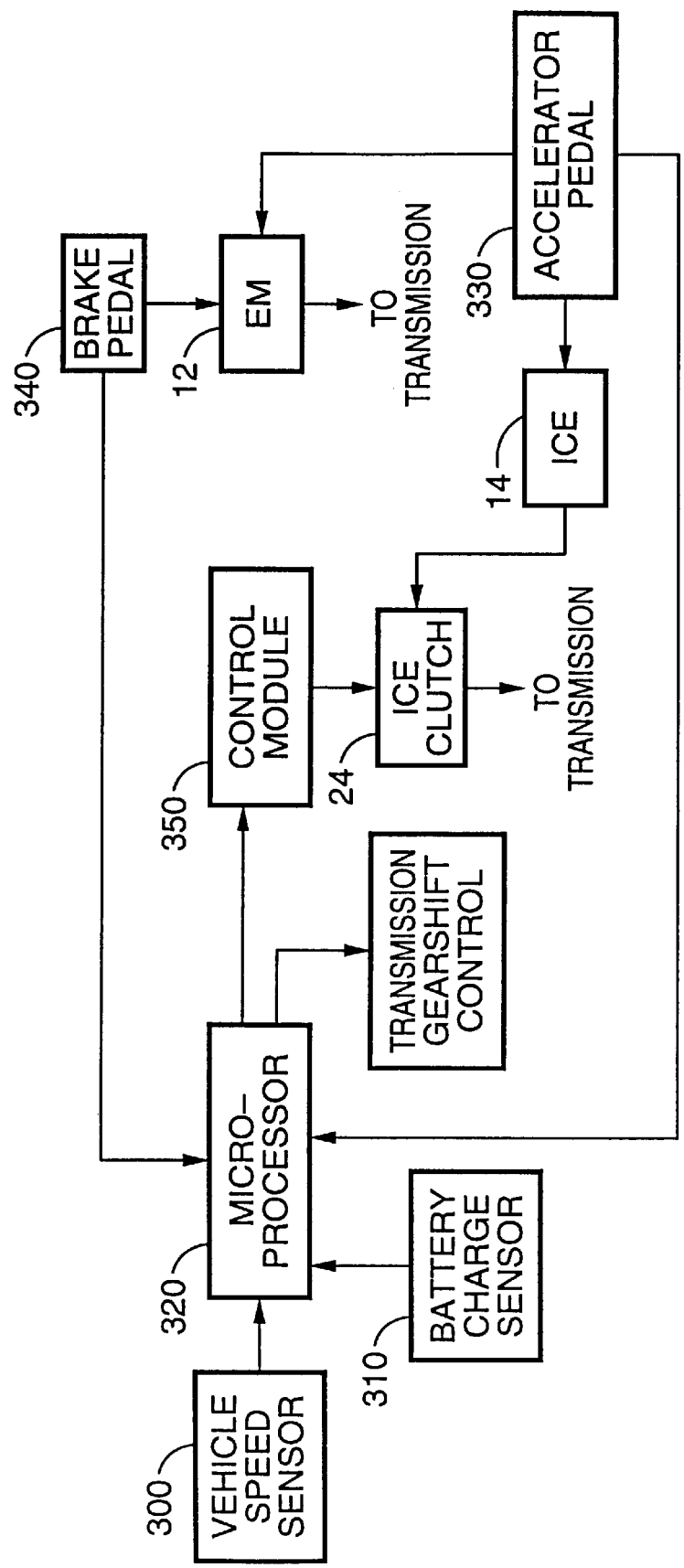
FIG. 5 is a block diagram of a charge depletion control system in accordance with the present invention.

Referring to FIG. 5, a preferred embodiment of a control system for implementing the control method of the present invention uses a microprocessor or the like which is programmed with the control parameters shown in FIG. 3 and FIG. 4. The control parameters shown in FIG. 4 could be programmed as a formula for fully dynamic monitoring and control or, alternatively, data points along the curve could be placed into a lookup table. Further, if a lookup table is used, a fuzzy logic implementation is contemplated to be within the scope of the invention. With any of the implementations, however, conventional sensors would be employed to monitor speed of the vehicle and depth of discharge of the battery to provide inputs to the microprocessor for control of the internal combustion engine.

The embodiment shown in FIG. 5 includes a vehicle speed sensor 300 and a battery depth of discharge sensor 310 which feeds a microprocessor 320. Microprocessor 320 also receives signals from an accelerator pedal 330 which provides information as described with reference to FIG. 5 below, and signals from a brake pedal 340 which provides information as described with reference to FIG. 7 below. Based on these inputs, microprocessor 320 then outputs control signals to a control module 350 which couples or uncouples clutch 24 and allows ICE 14 to operate based on the state of the batteries and vehicle speed. Microprocessor 320 also outputs control signals to a transmission control 360 which may select the gear ratio.

Referring also to FIG. 6, control of the EM 12 and the ICE 14 is further accomplished using a two stage, or dual-mode, accelerator pedal. Approximately the first 30% of pedal travel controls the throttle position of the ICE 14 and approximately the last 70% serves as a "+" torque control for the EM 12 to provide supplemental power to the ICE 14. When operating in the HEV mode (e.g., cruising speeds above 113 kph, or at lower speeds if battery depth of discharge exceeds 50%), the ICE 14 operates at wide open throttle most of the time and, when additional power is required (e.g., for accelerating, passing, climbing), the driver depresses the pedal further and the electric motor torque is increased. The pedal is mechanically linked to the ICE 14 and provides acceleration response proportional to the pedal position as in a conventional car. When the ICE is "off line" then the accelerator pedal simply has a deadspace which the driver cannot discern. As shown in FIG. 7, brake pedal 340 is also configured as a two stage, or dual-mode, pedal. Approximately the first 30% of pedal travel controls the regenerative braking of the EM 12, thus serving as a "−" torque control, and approximately the last 70% operates mechanical brakes.

Accordingly, it will be seen that this invention coordinates of the operation of the electric motor and an auxiliary power unit such as an internal combustion engine in a hybrid vehicle for efficient operation. Although the description above contains many specificities, these should not be construed as limiting the scope of the invention but as merely providing illustrations of some of the presently preferred embodiments of this invention. Thus the scope of this invention should be determined by the appended claims and their legal equivalents.

What is claimed is:

1. A method of controlling the operation of a hybrid electric vehicle having an electric motor, a battery powering the electric motor, and an auxiliary power unit, comprising the steps of:
   (a) sensing the speed of the vehicle;
   (b) sensing the level of the depth of discharge of the battery;
   (c) at vehicle speeds above a threshold speed, activating the auxiliary power unit to power the vehicle and using the electric motor to supplement the auxiliary power unit when required;
   (d) at vehicle speeds below the threshold speed, deactivating the auxiliary power unit and using the electric motor to power the vehicle; and
   (e) automatically and dynamically adjusting the threshold speed as a function of said level of the depth of discharge.

2. A method as recited in claim 1, further comprising the steps of discharging the battery by operation of the electric motor and charging the battery from the auxiliary power unit when said battery is substantially depleted.

3. A method as recited in claim 1, further comprising the step of charging the battery during regenerative braking of the electric motor.

4. A method as recited in claim 1, wherein said battery is never recharged by said auxiliary power unit during operation of said vehicle.

5. A method as recited in claim 1, wherein said battery is charge depleted during operation of said vehicle.

6. A method as recited in claim 1, wherein said threshold speed is dynamically reduced as the depth of discharge increases.

7. A method of operating a hybrid electric vehicle having an electric motor, a battery powering the electric motor, and an auxiliary power unit, comprising the steps of:
   (a) sensing the speed of the vehicle;
   (b) sensing the level of the depth of discharge of the battery;
   (c) at vehicle speeds above a first threshold speed, activating the auxiliary power unit to power the vehicle and using the electric motor to supplement the auxiliary power unit when required;
   (d) at vehicle speeds below a second threshold speed, deactivating the auxiliary power unit and using the electric motor to power the vehicle; and
   (e) automatically and dynamically adjusting at least one of said first and second threshold speeds as a function of said level of the depth of discharge.

8. A method as recited in claim 7, wherein said first and second threshold speeds are the same and deactivation of said auxiliary power unit is delayed.

9. A method as recited in claim 7, wherein said second threshold speed is lower than said first threshold speed, said first and second threshold speeds selected to reduce on/off cycling of said auxiliary power unit.

10. A method as recited in claim 7, further comprising the steps of discharging the battery by operation of the electric motor and charging the battery from the auxiliary power unit when said battery is substantially depleted.

11. A method as recited in claim 7, further comprising the step of charging the battery during regenerative braking of the electric motor.

12. A method as recited in claim 7, wherein said battery is never recharged by said auxiliary power unit during operation of said vehicle.

13. A method as recited in claim 7, wherein said battery is charge depleted during operation of said vehicle.

14. A method as recited in claim 7, wherein said threshold speeds are dynamically reduced as the depth of discharge increases.

15. An apparatus for controlling operation of a hybrid powered vehicle having an electric motor, a battery powering said electric motor, and an auxiliary power unit, comprising:
   (a) means for sensing the speed of the vehicle;
   (b) means sensing the level of the depth of discharge of the battery; (c) means, at vehicle speeds above a threshold speed, for activating said auxiliary power unit to power said vehicle and for using said electric motor to supplement said auxiliary power unit when required;
   (e) means, at vehicle speeds below said threshold speed, for deactivating said auxiliary power unit and using said electric motor to power said vehicle;
   (f) means for automatically dynamically adjusting said threshold speed as a function of said level of the depth of discharge.

16. An apparatus as recited in claim 15, wherein said battery is never recharged by said auxiliary power unit during operation of said vehicle.

17. An apparatus as recited in claim 15, wherein said battery is charge depleted.

18. An apparatus as recited in claim 15, wherein said threshold speed is dynamically reduced as the depth of discharge increases.

19. A control apparatus for a hybrid powered vehicle having an electric motor, a battery powering the electric motor, and an auxiliary power unit, comprising:
   (a) means for sensing the speed of the vehicle;
   (b) means for sensing the level of the depth of discharge of the battery;
   (c) means for, at vehicle speeds above a first threshold speeds activating the auxiliary power unit to power the vehicle and using the electric motor to supplement the auxiliary power unit when required;
   (d) means for, at vehicle speeds below a second threshold speed, deactivating the auxiliary power unit and using the electric motor to power the vehicle;
   (f) means for automatically and dynamically adjusting at least one of said first and second threshold speeds as a function of said level of the depth of discharge.

20. A method as recited in claim 19, wherein said first and second threshold speeds are the same and deactivation of said auxiliary power unit is delayed.

21. A method as recited in claim 19, wherein said second threshold speed is lower than said first threshold speed, said first and second threshold speeds selected to reduce on/of cycling of said auxiliary power unit.

22. An apparatus as recited in claim 19, wherein said battery is never recharged by said auxiliary power unit during operation of said vehicle.

23. An apparatus as recited in claim 19, wherein said battery is charge depleted.

24. An apparatus as recited in claim 19, wherein said threshold speeds are dynamically reduced as the depth of discharge increases.

25. A method of controlling the operation of a hybrid electric vehicle having an electric motor, a battery powering the electric motor, and an auxiliary power unit, comprising the steps of:
   (a) charging the battery from a power source external to the vehicle;
   (b) sensing the speed of the vehicle;
   (c) sensing the level of the depth of discharge of the battery;
   (d) at vehicle speeds above a threshold speed, automatically activating the auxiliary power unit to power the vehicle and using the electric motor to supplement the auxiliary power unit when required;
   (e) at vehicle speeds below the threshold speed, automatically deactivating the auxiliary power unit and using the electric motor to power the vehicle until the battery charge is substantially depleted; and
   (f) recharging the battery from at least one of the following:
      (i) said auxiliary power unit;
      (ii) regenerative braking; and
      (iii) a power source external to the vehicle.

26. A method as recited in claim 25, wherein said threshold speed is dynamically adjusted as a function of depth of discharge of said battery.

27. A method as recited in claim 26, wherein said dynamic adjustment of the threshold speed is automatic.

28. A method as recited in claim 26, wherein said threshold speed is dynamically reduced as the depth of discharge increases.

29. A method as recited in claim 28, wherein the dynamic reduction of said threshold speed is automatic.

30. A method of controlling the operation of a hybrid electric vehicle having an electric motor, a battery powering the electric motor, and an auxiliary power unit, comprising the steps of:
   (a) sensing the speed of the vehicle;
   (b) sensing the level of the depth of discharge of the battery;
   (c) at vehicle speeds above a threshold speed, activating the auxiliary power unit to power the vehicle and using the electric motor to supplement the auxiliary power unit when required;
   (d) at vehicle speeds below the threshold speed, deactivating the auxiliary power unit and using the electric motor to power the vehicle;
   (e) automatically and dynamically reducing the threshold speed as the depth of discharge increases, wherein the charge on said battery is depleted by operation of said electric motor; and
   (f) recharging the battery under a condition selected from the group comprising:
      (i) when said battery is in a substantially depleted state;
      (ii) when said battery is in a fully depleted state.

31. A method as recited in claim 30, further comprising the step of recharging the battery from at least one of the following:
   (i) said auxiliary power unit;
   (ii) regenerative braking; and
   (iii) a power source external to the vehicle.

* * * * *